(12) United States Patent
Broniak et al.

(10) Patent No.: US 9,124,098 B2
(45) Date of Patent: Sep. 1, 2015

(54) MANAGING EXCESS RENEWABLE ENERGY

(75) Inventors: Jay Andrew Broniak, Louisville, KY (US); Joseph Mark Brian, Louisville, KY (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 13/204,739

(22) Filed: Aug. 8, 2011

(65) Prior Publication Data
US 2013/0038122 A1   Feb. 14, 2013

(51) Int. Cl.
G05B 15/00 (2006.01)
H02J 4/00 (2006.01)

(52) U.S. Cl.
CPC ........................... H02J 4/00 (2013.01)

(58) Field of Classification Search
USPC ............................ 700/286; 705/412; 320/137
See application file for complete search history.

(56) References Cited

U.S. PATENT DOCUMENTS

| | | | |
|---|---|---|---|
| 2004/0133314 A1* | 7/2004 | Ehlers et al. ................. | 700/276 |
| 2004/0139038 A1* | 7/2004 | Ehlers et al. ................. | 705/412 |
| 2008/0272934 A1* | 11/2008 | Wang et al. ............... | 340/870.11 |
| 2009/0200988 A1* | 8/2009 | Bridges et al. ................ | 320/137 |
| 2010/0138066 A1* | 6/2010 | Kong ............................. | 700/295 |
| 2010/0217550 A1* | 8/2010 | Crabtree et al. ................ | 702/62 |
| 2010/0262312 A1* | 10/2010 | Kubota et al. ................. | 700/295 |
| 2011/0004358 A1* | 1/2011 | Pollack et al. ................ | 700/297 |
| 2011/0060474 A1* | 3/2011 | Schmiegel et al. .......... | 700/291 |
| 2011/0080044 A1* | 4/2011 | Schmiegel ...................... | 307/23 |
| 2011/0172841 A1* | 7/2011 | Forbes, Jr. .................... | 700/292 |
| 2012/0053740 A1* | 3/2012 | Venkatakrishnan et al. .. | 700/291 |
| 2012/0065796 A1* | 3/2012 | Brian et al. ................... | 700/295 |

* cited by examiner

Primary Examiner — Robert Fennema
Assistant Examiner — Anthony Whittington
(74) Attorney, Agent, or Firm — Dority & Manning, P.A.

(57) ABSTRACT

A renewable energy management system includes a load center that enables current flow into a renewable energy system generated from one or more sources and facilitates consumption of generated energy by one or more devices in the renewable energy system, and a smart meter that tracks energy flow in and out of the load center to measure energy consumption and energy production for the renewable energy system. The system also includes an energy manager in communication with the smart meter and at least one of the devices, wherein the energy manager signals the at least one of the devices to function as an energy storage device for storing excess renewable energy generated by the renewable energy system.

18 Claims, 3 Drawing Sheets

MANAGING EXCESS RENEWABLE ENERGY

BACKGROUND OF THE INVENTION

The subject matter disclosed herein relates generally to energy management, and more particularly to energy management of household energy consuming devices and/or systems.

In homes and other structures that utilize renewable energy sources (for example, a wind generator or solar panels), there are times when more energy is being produced/generated than is being consumed, for example, when an individual is at work during the day and his or her house is set to a low-power mode, significant amounts of surplus energy may be generated.

Currently, surplus energy would back-feed the grid, thereby resulting in the home or other structure acting as a pseudo power plant for the utility company, sending energy out onto the electric lines. Accordingly, there exists a need to more effectively use surplus energy generated in a home or other structure that utilizes renewable energy.

BRIEF DESCRIPTION OF THE INVENTION

As described herein, the exemplary embodiments of the present invention overcome one or more disadvantages known in the art.

One aspect of the present invention relates to a renewable energy management system that includes a load center that enables current flow into a renewable energy system generated from one or more sources and facilitates consumption of generated energy by one or more devices in the renewable energy system, and a smart meter that tracks energy flow in and out of the load center to measure energy consumption and energy production for the renewable energy system. The system also includes an energy manager in communication with the smart meter and at least one of the devices, wherein the energy manager signals the at least one of the devices to function as an energy storage device for storing excess renewable energy generated by the renewable energy system.

Another aspect relates to an apparatus including an energy manager in communication with a renewable energy system comprising one or more renewable energy generators, a smart meter and one or more energy consuming devices, wherein the energy manager signals the one or more devices to function as an energy storage device for storing excess renewable energy generated by the one or more renewable energy generators.

Yet another aspect of the present invention relates to a method comprising the steps of tracking energy consumption and energy production for a renewable energy system, and automatically diverting excess renewable energy generated by the renewable energy system to one or more devices within the renewable energy system when the energy production exceeds the energy consumption within the renewable energy system.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

Figure 1:
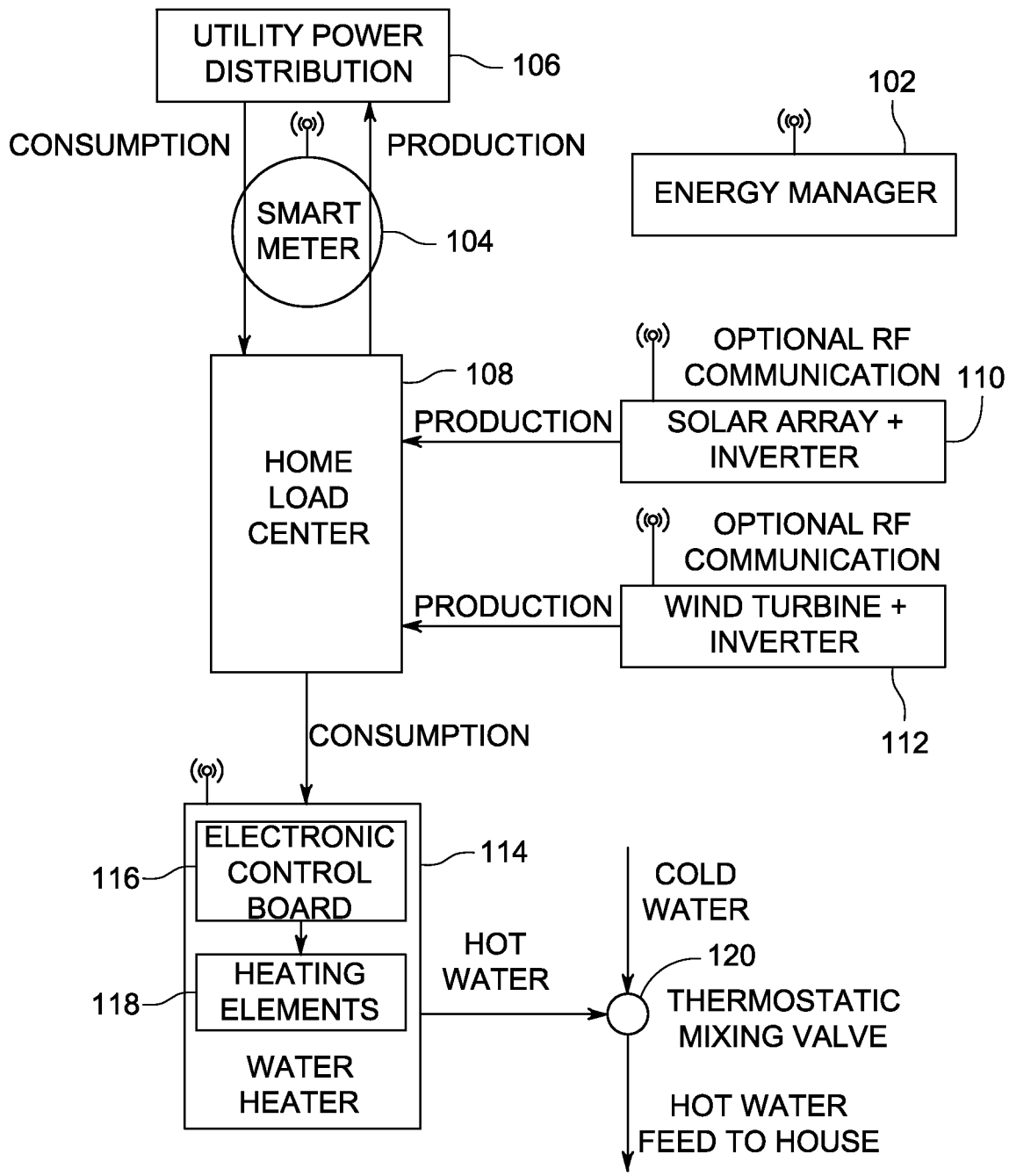
FIG. 1 presents example system architecture for managing excess renewable energy, in accordance with a non-limiting exemplary embodiment of the invention.

As described herein, one or more embodiments of the invention include techniques and apparatuses for managing excess renewable energy (for example, in a home energy management system).

The disclosure finds application, for example, to utility systems and appliances configured to manage energy loads to consumers through a communicating consumer control device, such as a home energy manager (HEM), programmable communicating thermostat (PCT), appliance controller, or the like.

This disclosure relates to energy management, and more particularly to electrical device control methods and electrical energy consumption systems. The disclosure finds particular application to energy management of appliances, for example, hot water heaters, dishwashers, clothes washers, dryers, HVAC systems, etc.

One or more embodiments of the invention can include using an energy management system for a home network that encompasses managed energy consuming devices respectively drawing different amounts of energy in a home. Renewable energy generation devices can include, for example, a solar panel, a wind power generation device, and/or other generation device and the natural resources comprise electricity, water, and/or natural gas, etc.

The energy management system is a home energy manager system that includes a central controller or central device controller with a memory. The controller is in communication with the managed energy consuming devices that respectively comprise device controllers. At least one measuring device is in communication with the controller and the managed devices, and is configured to collectively provide a total energy consumption measurement for the home as well as an energy consumption measurement for each managed device. For example, each device on the network reports its energy consumption to the energy management system controller. Thus, each appliance will report its respective energy consumption.

A user interface can be communicatively coupled to the central controller for providing user information and receiving user commands thereat. The central controller has a processor, at least one transceiver and is configured to monitor and control energy consumption. The central controller also provides feedback to the user interface display with respect to natural resource use and generation occurring at the home. Accordingly, one or more embodiments of the invention include an energy management system and techniques for managing energy consumption within a household or other structure.

Additionally, a flow meter of an energy management system can be configured to measure, for example, a flow of natural gas and/or water consumption. As further detailed herein, one or more renewable energy sources including solar photovoltaic production and wind energy production may also be included that have a means to measure and communicate energy generation. The controllers for the renewable energy sources are operatively coupled to the central controller. A thermostat controller can be coupled to the central controller that is configured to have its schedule and operating parameters modified via a client application coupled to the central controller and provide energy consumption data to the user via a user interface of a client application.

A home energy manager (HEM) includes an electronic system having a central controller that provides a homeowner the means to monitor and manage their energy consumption through a combination of behavior modification and programmed control logic. For example, the control logic can be contained in the managed device (refrigerator, water heater, etc.) The central controller provides real time feedback on electricity, water, and natural gas consumption as well as providing data on renewable energy generation occurring at the home, such as solar photovoltaic generation, wind generation, or any other type of renewable generation.

Additionally, in one embodiment of the invention, the central controller can store consumption data and provide data through an application programming interface (API). A central device can operate as a data server for providing data to a client application running on a client device, which in turn presents that data to the consumer, such as in graph form with data of historical/present energy usage, generation, storage, etc. Examples of client devices include a personal computer, smart phone or any other remote device in communication with the controller that has the processing and display capability to run such applications.

In another embodiment, data pertaining to the consumer's energy consumption, generated energy, and/or storage can be displayed on a user display (for example, liquid crystal display (LCD) touch screen display) that is integral to the central controller. The user interface is also presented via a web server running on the central controller to any display device capable of running a web browser. The web browser interface is accessible to any device in communication with the central controller web server such as a networked PC or mobile phone. The central controller is configured to operate as a gateway device. Information between a utility or energy provider and a home area network (HAN) is managed by the central controller. For example, the HAN comprises communication between the central controller and devices within a home.

Consumption data can be measured via sensors located at each of the incoming residential utility meters (for example, water, gas, and/or electric meters). In one embodiment, this data is collected by radio modules and transmitted wirelessly back to the central device and/or to an energy provider. In another embodiment, the radio modules include a power line transceiver sending information to and from each sensor or energy measuring device, each appliance and an energy provider, for example.

Also, as described further herein, a renewable energy device such as a solar or a wind generator that is equipped with a compatible method of communication can directly transmit its energy generation information directly to the central controller without the need for an external measurement system.

Accordingly, one or more embodiments of the invention include using a device (such as a water heater) as an energy storage device. By way of illustration, if a home uses a renewable energy source (for example, a wind generator or solar panels), the energy management system will know how much energy the house is consuming, and also how much energy the renewable energy source is producing. In one or more embodiments of the invention, at times when such a home is producing more energy than it is consuming, the system can use a hot water heater as a storage tank and raise the set-point above what it would normally be (thereby heating the water in the hot water tank via use of excess renewable energy).

As noted above, in current systems, surplus energy would, for example, back-feed the grid, providing energy out onto the electric lines instead of having it be received by the house/provider. One or more embodiments of the invention enables using or storing surplus energy within the same home system (for example, using excess energy to heat hot water in a water heater that would otherwise have to be independently heated at a later time).

As described herein, one or more embodiments of the invention can be implemented in connection with a hot water heater, but other devices such as a hybrid-electric car, any type of battery storage, an air conditioning system, etc., capable of storing energy (for example, one or more large watt consumers inside a house) can be used in an implementation as well.

Also, one or more embodiments of the invention can include an interface where a user can select where to divert the excess energy. Accordingly, as detailed herein, this invention can optimizes hot water heater heating cycles (for example, in a micro-processor controlled hot water heater) to take full advantage of any excess renewable energy via a control algorithm that can preferentially create higher temperature hot water when excess renewable energy is available.

By way of illustration, a hot water heater can include a controller in accordance with an illustrative embodiment of the present disclosure. The hot water heater can also include a reservoir for storing water, and a heat source for heating the water stored in the reservoir. A supply line supplies water to the hot water heater (for example, from a municipal supply, well). Hot water outlet line supplies hot water from the heater to the pipes of a residence, for example, for supplying hot water to one or more plumbing fixtures.

In the illustrated embodiments, the specific details of hot water heater construction have been omitted. It will be appreciated, however, that the hot water heater can be any conventional hot water heater including an electric or hybrid hot water heater.

Electronically controlled water heaters typically have a set-point that is fixed by the consumer and remains constant from day to day. More advanced systems may include a feature whereby the hot water heater can be programmed to operate at specific set-points and modes based on a recurring schedule.

Using a water heater (and/or additional devices) as a storage medium for excess available renewable energy can be illustrated by the following example. A consumer has renewable (wind or solar) energy available at his or her home. On a particular day the home is consuming less energy than is available from renewable sources, the excess energy can be stored as hot water by temporarily increasing the set-point and/or operating mode of the water heater such that the water stored in the water heater reservoir is raised to a higher than normal temperature.

As described herein, this can be carried out via an energy management software algorithm whereby a microprocessor controlled electric water heater can have its set-point and/or operating mode adjusted by a home energy management system in real-time as a function of available renewable energy.

FIG. 1 presents example system architecture for managing excess renewable energy, in accordance with a non-limiting exemplary embodiment of the invention. It should be appreciated that FIG. 1 depicts an embodiment of the invention wherein excess renewable energy is being managed in connection with a hot water heater, but, as detailed herein, a number of other devices could be implemented as well. By way of illustration, FIG. 1 depicts a home energy manager 102, a smart meter 104, a utility power distribution component 106, a home load center 108, a solar array and inverter 110, a wind turbine and inverter 112, a water heater 114 (which includes an electronic control board 116 and heating elements 118) and a thermostatic mixing valve 120.

Home energy manager 102 comprises an electronic system having a central controller that provides a homeowner the means to monitor and manage their energy consumption through a combination of behavior modification and programmed control logic. More specifically, an energy management system for a home network can include a central device controller configured to communicate with energy consuming devices, energy generation devices and storage devices at a home. Power/energy measuring devices provide consumption measurements for the home and each device to the controller. A user interface client application can be configured to provide real time information to a user/consumer and to an energy provider/utility about the consumption of the home, each device, and receives inputs to modify the controllers and/or the devices.

As depicted in FIG. 1, when energy manager 102 detects net energy production for the home (that is, production is greater than consumption), it signals the water heater to increase power consumption. Energy manager 102 communicates wirelessly with smart meter 104 and other network devices, and decision-making steps are carried out by the energy manager component (in connection with the home load center 108). In one or more embodiments of the invention, the objective of the algorithm is to use 100% of available renewable energy at all times.

Smart meter 104 is capable of tracking energy consumption (delivered from a utility to a home) and energy production (delivered from a home to a utility). A solar array 110 can transform energy from sunlight into DC current, which is converted to AC current and fed into the home load center 108. Additionally, a turbine 112 can transform wind energy into DC current, which is converted to AC current and fed into the home load center 108.

A water heater 114 is in communication with the energy manager 102 and has the ability to adjust its energy consumption profile (and thus raise water temperatures) based on commands received from the energy manager. Mixing valve 120 regulates the temperature on the house hot water feed to the normal user set level so that the temperature of the water in the tank can be raised to a higher level without affecting the temperature of the hot water delivered to the user.

The energy manager monitors the power generated at both inverters via a communication link in real-time. The energy manager is also aware of the whole home electrical load presented to the utility through communication with the smart meter (or other whole home power measurement device).

Accordingly, when the energy manager detects that available renewable energy is in excess of energy being consumed in the home (meaning that the home is back-feeding the utility), the energy manager can send a command to the water heater to adjust its set-point and/or operating mode to a setting that would result in higher average energy consumption by the water heater. For a hybrid heat-pump water heater, for example, this could either engage the heat pump or the electric resistance heater.

By raising the temperature of the water in the tank, the water heater is effectively being used as an energy storage cell that is being charged at minimal or no cost to the consumer. When renewable energy is not available, the water heater can be returned to its normal set-point.

One or more embodiments of the invention include the incorporation of a mixing valve at the output of the water heater to regulate the temperature of water delivered to the home, regardless of the actual tank temperature. The mixing valve allows the system to have higher set-points when the temperature boosting occurs without increasing the temperature of the water delivered to the user beyond the desired range. Additionally, to guard against excessively hot water, there may be an upper limit on the maximum set-point of the water heater. In one or more embodiments of the invention, if surplus energy is available after the water temperature has been raised to the maximum set-point, the surplus may be back-fed to the grid or the renewable energy generator may be switched to a lower output or shut-off.

Figure 2:
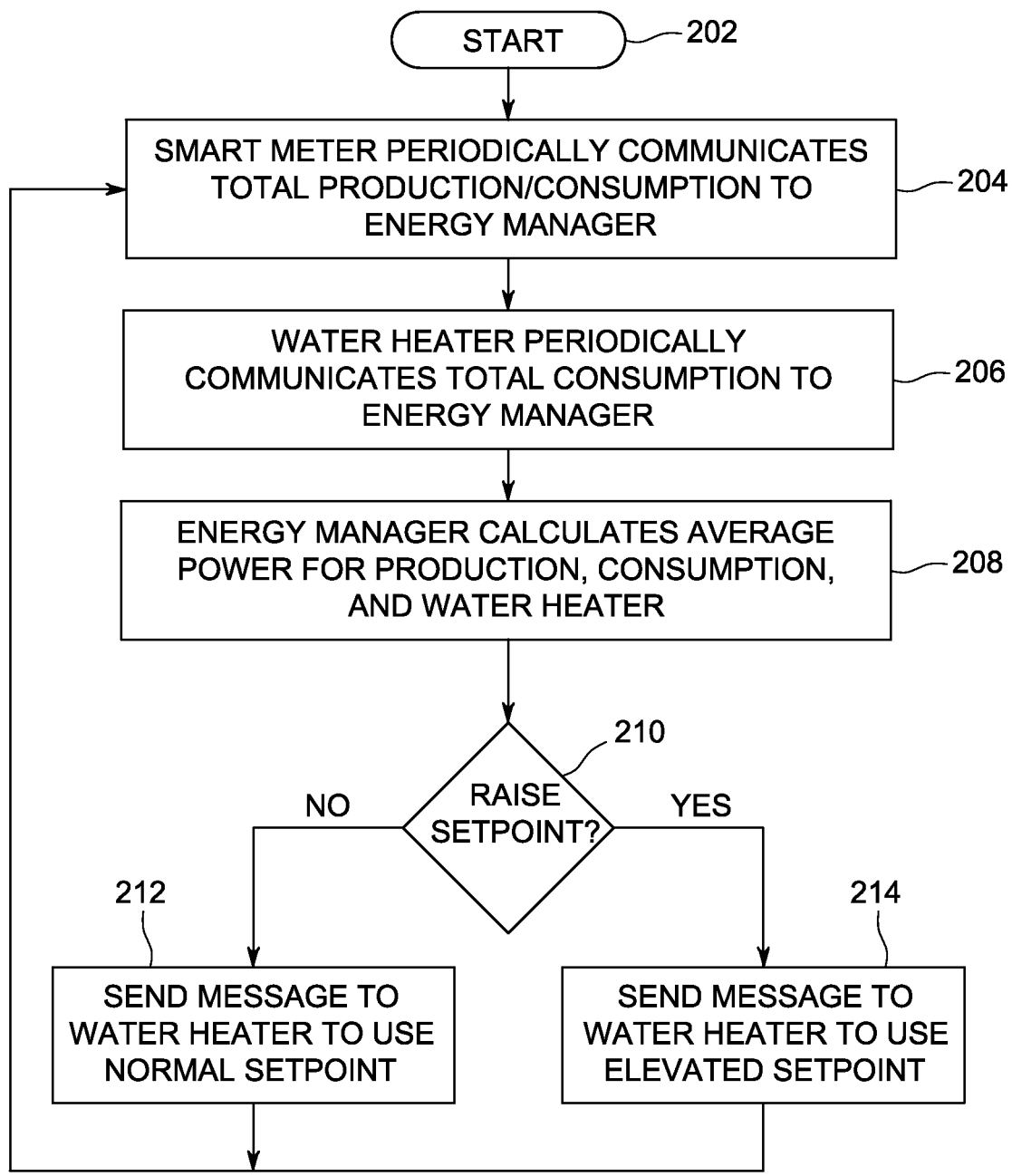
FIG. 2 is a flow chart of a method for heating water with excess renewable energy, in accordance with a non-limiting exemplary embodiment of the invention.

FIG. 2 is a flow chart of a method for heating water with excess renewable energy, in accordance with a non-limiting exemplary embodiment of the invention. The process begins at Step 202. At Step 204, the smart meter periodically communicates total energy production/consumption to the energy manager. For example, the energy manager can poll the smart meter on a periodic basis to obtain the total energy produced/generated and total energy consumed by the home. This information is stored in the energy manager database.

At Step 206, the total water heater energy consumption is periodically communicated to the energy manager. For example, the water heater can send cumulative energy consumption (watt-hours) to the energy manager on a periodic basis. The water heater can be equipped with a software algorithm for estimating its energy consumption based on known system states (for instance, heater status, heat pump status, fan status) that are correlated in a power look-up table. Such techniques are similar to methods used in other standard appliances. Alternately, the water heater may be equipped with internal current sensors connected to the microprocessor that will allow the unit to directly measure and report its power. This information is stored in the energy manager database. At Step 208, the energy manager calculates average energy production and consumption. The energy manager compares each new energy reading from the smart meter to the previous reading and calculates if net energy is flowing into or out of the home. A smart meter maintains separate tables for cumulative energy consumption (flowing into the home) and cumulative energy production (flowing out of the home). The energy manager can query these tables on a periodic basis and by comparing current readings with previous readings and by performing simple subtraction, make a determination if the net energy flow is into or out of the home. Consider the following example:

|      | Production | Consumption |
|------|------------|-------------|
| Time 1:00:00 | 100 | 2000 |
| Time 1:01:00 | 140 | 2020 |

In 1 minute of elapsed time, (140−100=40) watt-hours have been produced and (2020−2000=20) watt-hours have been consumed.

Production−Consumption=40−20=20 Watt Hours.

Producing 20 watt-hours (wh) in 1 minute (min) is equivalent to an average power of 1200 watts continuous. (20 wh/1 mim)=(Xwh/60 min). Therefore, X=1200 watts.

Based on this analysis, it is known that between 1:00 and 1:01, the home in question was a net producer of energy at a rate of 1200 watts continuous. All that is needed to be known is the elapsed time and two successive meter readings for the production and consumption tables stored in the meter.

In a similar fashion, the energy manager can calculate the energy consumption of the hot water heater.

Step 210 includes determining whether to raise the set-point of the water heater. One or more embodiments of the invention include making the determination as follows: P=Calculated Energy Production from renewables; C=Calculated Whole Home Energy Consumption; WH=Calculated Water Heater Energy Consumption. Threshold=system variable, to be tuned for algorithm; Threshold is calculated as a function of water heater power; Threshold=Rated Water Heater Power−WH. If (P−C) ≥Threshold Raise WH set-point. If (P−C)<Threshold: Normal WH set-point.

Accordingly, if the set-point is not to be raised, step 212 includes sending a message to the water heater to use the normal set-point. If the set-point is to be raised, step 214 includes sending a message to the water heater to use an elevated set-point.

One advantage that may be realized in the practice of some embodiments of the described systems and techniques is using available microprocessor processing power and network communications to enhance functions of a water heater and save money for the consumer.

Figure 3:
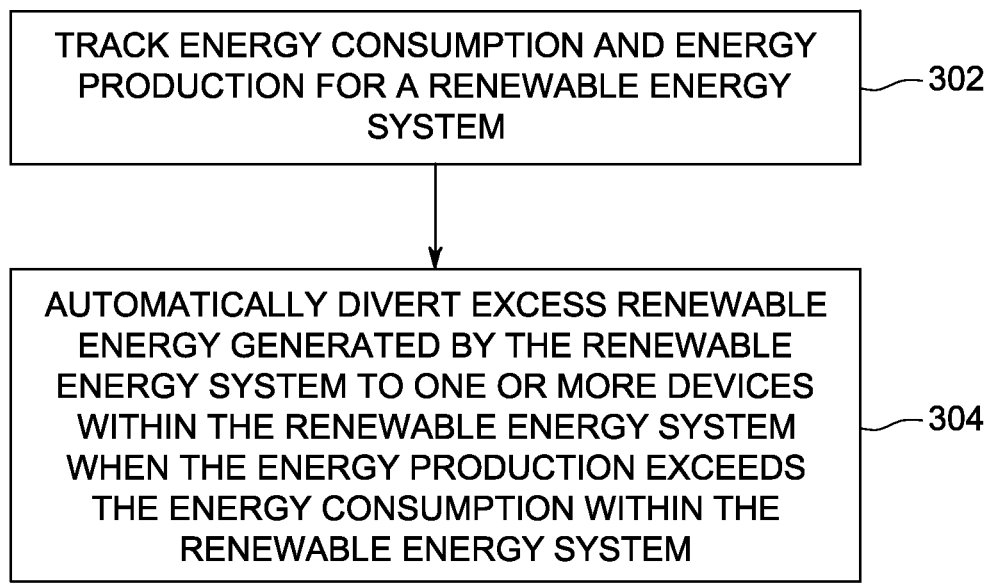
FIG. 3 is a flow chart of a method for managing excess renewable energy generated by a renewable energy system, in accordance with a non-limiting exemplary embodiment of the invention.

Reference should now be had to the flow chart of FIG. 3. Step 302 includes tracking energy consumption and energy production for a renewable energy system comprising a network of energy generating devices such as solar or wind generation systems, and energy consuming devices such as household appliances including a water heater all of which also receive energy from an external utility company. Step 304 includes automatically diverting excess renewable energy generated by the renewable energy system to one or more devices within the renewable energy system when the energy production exceeds the energy consumption within the system. As detailed herein, a device can include a hot water heater, a hybrid-electric car, battery storage, an air conditioning system, etc.

The techniques depicted in FIG. 3 also include calculating average power for total system energy production and total system energy consumption by comparing each new energy reading to a previous reading to determine if net energy is flowing into or out of the system, that is, from or to the external utility. Additionally, one or more embodiments of the invention include determining whether to store excess energy in a device, based on a threshold comparison for the device.

Further, given the discussion thus far, it will be appreciated that, in general terms, an exemplary apparatus, according to another aspect of the invention, includes a renewable energy management system (for example, a component of a residential home) that includes a load center, a smart meter and an energy manager. As described herein, "renewable energy system" includes everything on the electrical grid from the smart meter facing inward to a house. This includes all loads (appliances), the load center, and any renewables such as solar panels (but does not include the utility). As detailed herein, net power either flows from the utility to the house or from the house to the utility.

A load center enables current flow in/out of a renewable energy system (for example, a residential system) and facilitates consumption of generated energy by one or more devices in the system. A load center (for example, a breaker box in a house) enables current flow by virtue of the fact that it (that is, the load center) houses electrical conductors that permit current flow from the utility lines to electrical loads (such as appliances) in the home. All current from the utility passes through the smart meter and then to the load center, where it is distributed to the house. A smart meter tracks current flow in/out of the load center, and thus, can calculate energy consumption and energy production for the renewable energy system. Also, the smart meter periodically communicates total system energy production and total system energy consumption to the energy manager. Similarly, the one or more devices within the system periodically communicate total device energy consumption to the energy manager. An energy manager is in communication with the smart meter and the device(s), and signals the device(s) to function as an energy storage device for storing excess renewable energy generated by the renewable energy system.

As described herein, a device can include a hot water heater wherein excess renewable energy is diverted to the hot water heater to create hot water by temporarily adjusting a set-point of the water heater.

Further, one or more embodiments of the invention also include an interface to enable a user to select where to divert excess energy, wherein the interface is communicatively coupled to the energy manager for providing user information and receiving user commands thereat.

Figure 4:
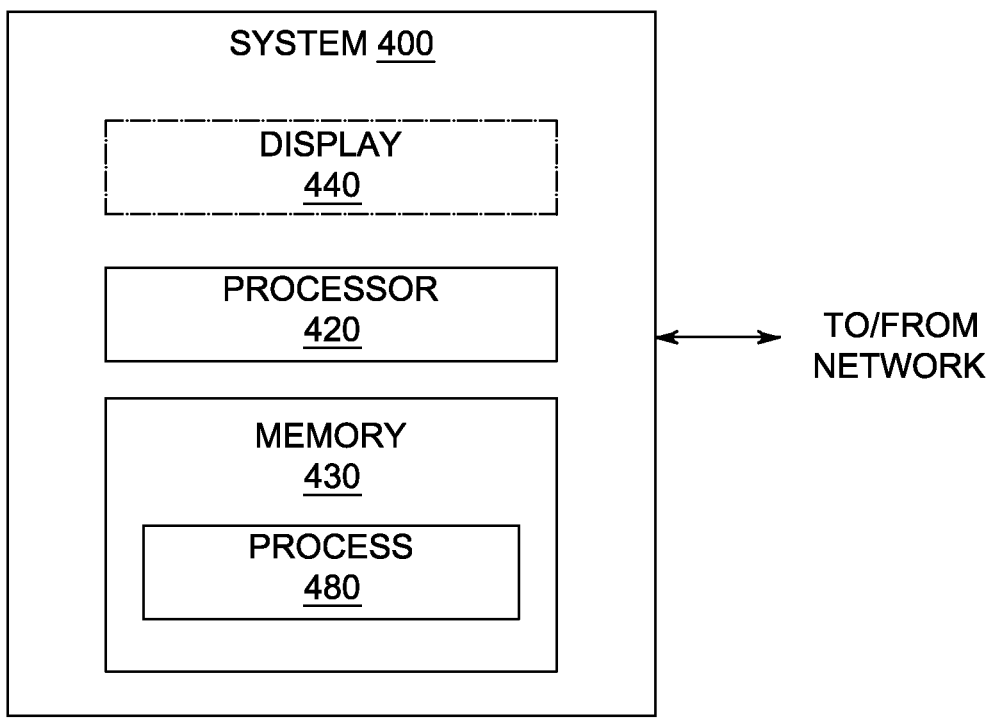
FIG. 4 is a block diagram of an exemplary computer system useful in connection with one or more embodiments of the invention.

Aspects of the invention (for example, an energy manager such as depicted in FIG. 1 or a workstation or other computer system to carry out design methodologies) can employ hardware and/or hardware and software aspects. Software includes but is not limited to firmware, resident software, microcode, etc. FIG. 4 is a block diagram of a system 400 that can implement part or all of one or more aspects or processes of the invention. As shown in FIG. 4, memory 430 configures the processor 420 to implement one or more aspects of the methods, steps, and functions disclosed herein (collectively, shown as process 480 in FIG. 4). Different method steps could theoretically be performed by different processors. The memory 430 could be distributed or local and the processor 420 could be distributed or singular. The memory 430 could be implemented as an electrical, magnetic or optical memory, or any combination of these or other types of storage devices. It should be noted that if distributed processors are employed (for example, in a design process), each distributed processor that makes up processor 420 generally contains its own addressable memory space. It should also be noted that some or all of computer system 400 can be incorporated into an application-specific or general-use integrated circuit. For example, one or more method steps (for example, such as those detailed herein) could be implemented in hardware in an application-specific integrated circuit (ASIC) rather than using firmware. Display 440 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a processor or other computer system, to carry out all or some of the steps to pen form the methods or create the apparatuses discussed herein. A computer-usable medium may, in general, be a recordable medium (for example, floppy disks, hard drives, compact disks, EEPROMs, or memory cards) or may be a transmission medium (for example, a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer system can contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, an energy manager, can make use of computer technology with appropriate instructions to implement method steps described herein.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

It will be understood that processors or computers employed in some aspects may or may not include a display, keyboard, or other input/output components. In some cases, an interface is provided.

Thus, while there have shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A renewable energy management system comprising:
a load center that enables current flow into a renewable energy system generated from one or more sources and facilitates consumption of generated energy by one or more energy consuming devices in the renewable energy system;
a smart meter that tracks energy flow in and out of the load center to measure energy consumption by the one or more energy consuming devices and energy production by the one or more sources for the renewable energy system; and
an energy manager in communication with the smart meter and at least one of the energy consuming devices, wherein the energy manager is configured, responsive to determining that energy production measured by the smart meter exceeds energy consumption measured by the smart meter, to signal at least one of the energy consuming devices to store a portion of excess energy generated by the renewable energy system instead of the load center providing said portion of excess energy to a utility,
wherein the one or more energy consuming devices comprise a hot water heater, the hot water heater comprising a water reservoir, and
wherein signaling said at least one energy consuming device comprises adjusting a temperature set-point of the hot water heater such that the hot water heater stores energy in the hot water reservoir.

2. The system of claim 1, wherein the one or more energy consuming devices further comprise one or more of a hybrid-electric car, a storage battery, and an air conditioning system.

3. The system of claim 1, wherein the hot water heater comprises an electronic control board, one or more heating elements, and a thermostatic mixing valve to enable higher tank storage temperatures while regulating temperature on a hot water feed.

4. The system of claim 1, wherein the renewable energy system is a component of a residential home.

5. The system of claim 1, wherein a source in the renewable energy system comprises a solar power generation device.

6. The system of claim 1, wherein a source in the renewable energy system comprises a wind power generation device.

7. The system of claim 1, wherein the smart meter periodically communicates total system energy production and total system energy consumption to the energy manager.

8. The system of claim 1, wherein the one or more energy consuming devices periodically communicate total device energy consumption to the energy manager.

9. The system of claim 1, wherein the energy manager calculates average power for total system energy production and total system energy consumption by comparing each new energy reading from the smart meter to a previous reading to determine if net energy is flowing into or out of the system.

10. The system of claim 1, wherein the energy manager determines whether to store excess energy in the one or more energy consuming devices, based on a threshold comparison for the one or more energy consuming devices.

11. The system of claim 1, further comprising an interface to enable a user to select where to divert excess energy, wherein the interface is communicatively coupled to the energy manager for providing user information and receiving user commands thereat.

12. An apparatus comprising:
an energy manager in communication with a renewable energy system comprising one or more renewable energy generators, a smart meter, a load center and one or more energy consuming devices,
wherein the energy manager is configured, responsive to determining that energy production measured by the smart meter exceeds energy consumption measured by the smart meter, to signal at least one of the energy consuming devices to store a portion of excess energy generated by the renewable energy system instead of the load center providing said portion of excess energy to a utility,
wherein the one or more energy consuming devices comprise a hot water heater, the hot water heater comprising a water reservoir, and
wherein signaling said at least one energy consuming device comprises adjusting a temperature set-point of the hot water heater such that the hot water heater stores energy in the water reservoir.

13. The apparatus of claim 12, wherein the energy consuming devices are operatively coupled to the external utility and to the one or more renewable energy generators, to receive energy from the utility and the one or more generators, and wherein the energy manager comprises an algorithm for calculating average power for total system energy production and total system energy consumption by comparing each new energy reading from the smart meter to a previous reading to determine if net energy is flowing from or to the utility.

14. The apparatus of claim 12, wherein the energy manager comprises an algorithm for determining whether to store excess energy in the one or more devices based on a threshold comparison for the one or more devices.

15. A method for managing excess renewable energy generated by a renewable energy system, comprising the steps of:
tracking energy consumption and energy production for the renewable energy system; and
automatically diverting excess renewable energy generated by the renewable energy system to one or more energy consuming devices within the renewable energy system when the energy production exceeds the energy consumption within the renewable energy system,
wherein automatically diverting excess renewable energy generated by the renewable energy system comprises signaling at least one of the energy consuming devices to store a portion of excess energy generated by the renewable energy system instead of the load center providing said portion of excess energy to a utility,
wherein the one or more energy consuming devices comprise a hot water heater, the hot water heater comprising a water reservoir, and
wherein signaling said at least one energy consuming device comprises adjusting a temperature set-point of the hot water heater such that the hot water heater stores energy in the hot water reservoir.

16. The method of claim 15, wherein the one or more energy consuming devices further comprise one or more of a hybrid-electric car, a battery storage, and an air conditioning system.

17. The method of claim 15, further comprising calculating average power for total system energy production and total system energy consumption by comparing each new energy reading to a previous reading to determine if net energy is flowing into or out of the renewable energy system.

18. The method of claim 15, further comprising determining whether to store excess energy in the said at least one energy consuming device, based on a threshold comparison for the one or more energy consuming devices.

* * * * *